Patented June 5, 1951

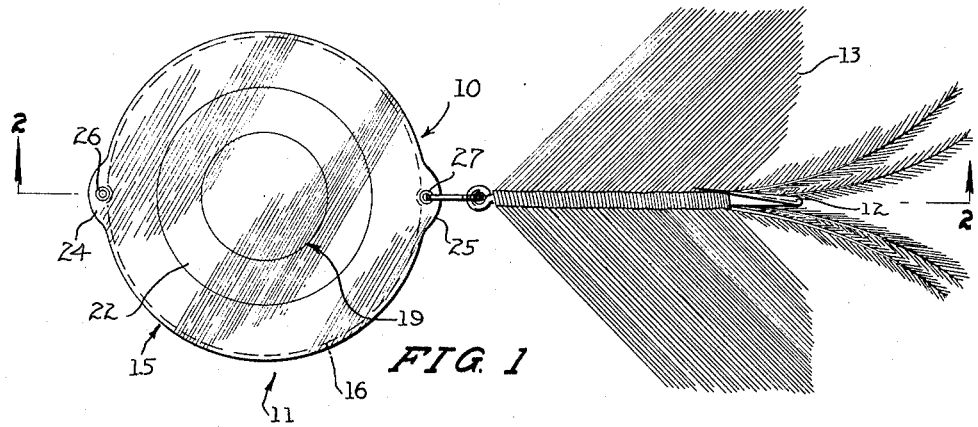
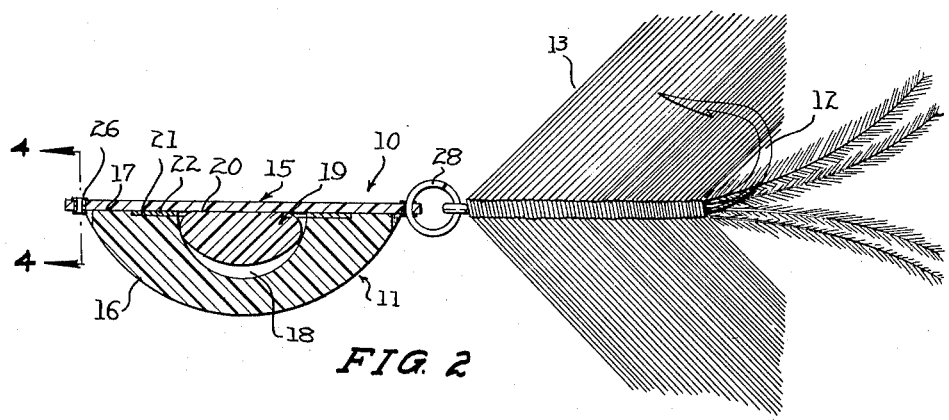
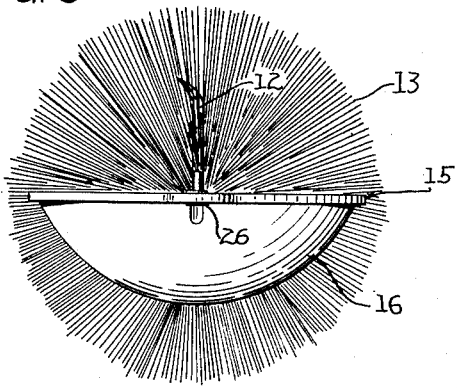
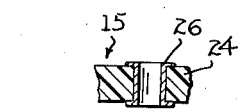

2,555,435

UNITED STATES PATENT OFFICE 2,555,435

ARTIFICIAL LURE FOR CASTING

Kenneth G. Caen, St. Louis, Mo.

Application September 26, 1950, Serial No. 186,809

4 Claims. (Cl. 43—42.33)

This invention relates to fishing equipment, and more particularly to an artificial lure for casting.

An object of this invention is to provide an artificial lure which includes means creating a novel effect when the lure is viewed from below.

Another object of this invention is to provide an artificial lure having a transparent body adapted to transmit an enlarged, novel light effect of a predetermined design downwardly into a body of water.

A further object of this invention is to provide an artificial lure for creating a novel light effect which is further adapted to move about in a wobbling and darting manner and to create popping sounds upon being drawn along in a body of water.

A still further object of this invention is to provide an artificial lure for casting which is relatively simple in structure and cheap to manufacture.

The above and still further objects and advantages of the invention will become apparent upon consideration of the following detailed description of the invention, when taken in conjunction with the accompanying drawings, wherein:

Figure 1 is a top plan view of the artificial lure of the present invention;

Figure 2 is a sectional view taken along the line 2—2 of Figure 1;

Figure 3 is an elevational view of the artificial lure of the present invention, viewed from the left of Figures 1 and 2; and Figure 4 is an enlarged fragmentary sectional view taken along the line 4—4 of Figure 2.

Referring now more particularly to the drawings, wherein like reference numerals have been used throughout the several views to designate like parts, there is shown the artificial lure of the present invention, designated by the reference numeral 10, which embodies a lure body 11, a hook 12 carried by the lure body, and a buck tail 13 substantially surrounding the hook 12 and secured thereto.

The lure body 11 includes a flat, circular base or disc 15 fabricated of a transparent plastic material and adapted for securement to the fishing line and for supporting the fishhook 12. Abutting against the under face of the disc 15 is a lens 16 in the shape of a hollow, spherical segment having its flat face 17 fixedly secured to the under surface of the disc 15, as clearly illustrated in Figure 2. The hollow lens 16 and the disc 15 cooperate to form a closed chamber 18 in the shape of a spherical segment.

Positioned within the chamber 18 and loosely supported therein is an opaque eye piece 19 which is in the shape of a spherical segment and has its flat face 20 confronting the under face of the disc 15.

The flat face 17 of the lens 16 is provided with an annular seat 21 for the support thereon in surrounding relation with respect to the eye piece 19 of an annular band 22 fabricated of a colored material. The eye piece 19 and the annular band 22 cooperate to provide a design positioned within the lens 16 for creating a novel effect when the lower body 11 is viewed from below.

For effecting the securement of the disc 15 to the hook 12 and to a fishing line, not shown, the disc is provided with opposed annular extensions 24, 25. Supported transversely of each of the annular extensions are eyelets 26, 27 which provide reinforced apertures for effecting the securement of the lure body 11 to a line and the hook. As clearly shown in Figure 4, the eyelet 26 is in the form of an open-ended cylindrical sleeve having one end crimped into overlying and abutting relation with respect to the upper surface of the extension 24 and having the other end crimped into overlying and abutting relation with respect to the lower surface of the extension 24.

Embracingly received and supported within the eyelet 27 is a closed ring 28 which carries the hook 12 on which is supported longitudinally thereof the buck tail 13.

In a preferred embodiment of the artificial lure 10 of the present invention, it has been found that a black eye piece 19 surrounded by a bright green band 22 creates a design which is particularly desirable. With the aforementioned design, it has been found desirable to employ a black and white buck tail 13. However, it is to be noted that any color combination may be employed in the artificial lure of the present invention.

In actual use, a fishing line, not shown, is extended through the eyelet 26. The weight distribution of the lure body 11 will normally maintain the latter in a position wherein the lens 16 faces downwardly so that the novel effect created by the eye piece 19 and the annular band 22 will be in the line of vision of a fish. Upon moving the lure along the surface with short, jerky motions, a wobbling and darting motion will be imparted to the lure, and at the same time a popping sound will be created, due to the abutment of the eye piece 19 with the adjacent portions of the disc 15 and the lens 16.

Although only one embodiment of the artificial lure of the present invention has been described, it is readily apparent that numerous modifications can be made without departing from the spirit of the invention as set forth in the appended claims.

What I claim is:

1. An artificial lure comprising a flat circular base fabricated of transparent material and adapted for securement to a fishing line and for supporting a fishhook, an eye fabricated of opaque material disposed centrally of and underlying said base and loosely mounted on the latter, and lens means surrounding said eye and dependingly carried by said base for magnifying said eye to thereby create a novel effect when the lure is viewed from below.

2. An artificial lure comprising a flat circular base fabricated of transparent material and adapted for securement to a fishing line and for supporting a fishhook, an eye fabricated of opaque material disposed centrally of and underlying said base and loosely mounted on the latter, an annular band fabricated of a colored material circumposed about said eye and secured to the under face of said base, and lens means surrounding said eye and annular band and dependingly carried by said base for magnifying said eye and annular band to thereby create a novel effect when the lure is viewed from below.

3. An artificial lure comprising a flat circular base fabricated of transparent material and adapted for securement to a fishing line and for supporting a fishhook surrounded by a buck tail, and a lens in the shape of hollow spherical segment having its flat face abutting against one face of said base and fixedly secured thereto and cooperating therewith to form a closed chamber, said chamber having a design therein for creating a novel light effect when the lure is viewed from below.

4. An artificial lure comprising a flat circular base fabricated of transparent material and adapted for securement to a fishing line and for supporting a fishhook surrounded by a buck tail, and a lens in the shape of a hollow spherical segment having its flat face abutting against one face of said base and fixedly secured thereto and cooperating therewith to form a closed chamber, said chamber having a design therein for creating a novel light effect when the lure is viewed from below, said design comprising an annular band fabricated of colored material supported in abutting relation with respect to said one face of said base, and an eye in the shape of a spherical segment loosely mounted within said chamber with the flat face thereof confronting said one face of said base.

KENNETH G. CAEN.

REFERENCES CITED

The following references are of record in the file of this patent:

UNITED STATES PATENTS

| Number | Name | Date |
| --- | --- | --- |
| 1,847,397 | Hofschneider | Mar. 1, 1932 |
| 2,006,604 | Post | July 2, 1935 |
| 2,149,464 | Potts | Mar. 7, 1939 |
| 2,309,521 | Mabee | Jan. 26, 1943 |